United States Patent
De Carolis et al.

(10) Patent No.: US 10,006,557 B2
(45) Date of Patent: Jun. 26, 2018

(54) VALVE MANIFOLD CIRCUIT BOARD WITH SERIAL COMMUNICATION AND CONTROL CIRCUIT LINE

(71) Applicant: Numatics, Incorporated, Novi, MI (US)

(72) Inventors: Enrico De Carolis, Oakland Township, MI (US); Scott Heriot, Phoenix, AZ (US); Brian Grissom, Phoenix, AZ (US)

(73) Assignee: Asco, L.P., Novi, MI (US)

( * ) Notice: Subject to any disclaimer, the term of this patent is extended or adjusted under 35 U.S.C. 154(b) by 0 days. days.

(21) Appl. No.: 15/720,535

(22) Filed: Sep. 29, 2017

(65) Prior Publication Data

US 2018/0023718 A1    Jan. 25, 2018

Related U.S. Application Data

(63) Continuation-in-part of application No. 14/765,019, filed as application No. PCT/US2013/032277 on Mar. 15, 2013, now Pat. No. 9,856,985.

(51) Int. Cl.
| | |
|---|---|
| *F16K 31/02* | (2006.01) |
| *F16K 21/00* | (2006.01) |
| *F16K 27/00* | (2006.01) |
| *F16K 31/06* | (2006.01) |
| *G05B 15/02* | (2006.01) |

(52) U.S. Cl.
CPC .............. *F16K 31/02* (2013.01); *F16K 21/00* (2013.01); *F16K 27/003* (2013.01); *F16K 31/0603* (2013.01); *G05B 15/02* (2013.01); *Y10T 137/87885* (2015.04)

(58) Field of Classification Search
CPC ........ F16K 31/02; F16K 21/00; F16K 27/003; F16K 31/0603; G05B 15/02; Y10T 137/87885
See application file for complete search history.

(56) References Cited

U.S. PATENT DOCUMENTS

| | | | |
|---|---|---|---|
| 4,815,496 A | * | 3/1989 | Nishitani ............ F15B 13/0814 137/271 |
| 4,889,164 A | * | 12/1989 | Hozumi ............. F15B 13/0814 137/596.16 |
| 4,896,700 A | | 1/1990 | Stoll |
| 4,950,170 A | | 8/1990 | Miller, Jr. |
| 5,000,226 A | | 3/1991 | Stoll et al. |

(Continued)

FOREIGN PATENT DOCUMENTS

| | | |
|---|---|---|
| DE | 10203792 A1 | 8/2003 |
| DE | 202005021299 U1 | 8/2007 |

(Continued)

*Primary Examiner* — Jessica Cahill
*Assistant Examiner* — Frederick D Soski
(74) *Attorney, Agent, or Firm* — Reising Ethington, P.C.

(57) ABSTRACT

A fluid control system has a first series of connected circuit boards that each actuate a respective valve unit mounted to a manifold block. A first communication module has a valve driver with a plurality of outputs for actuating the valve units connected to the first series of connected circuit boards. A serial control line extends through the first series of connected circuit boards and is connected to a second driver for actuating a second series of connected circuit boards.

6 Claims, 9 Drawing Sheets

(56) References Cited

U.S. PATENT DOCUMENTS

| | | | |
|---|---|---|---|
| 5,234,033 A | 8/1993 | Stoll et al. | |
| 5,277,622 A | 1/1994 | Liljenberg et al. | |
| 5,348,047 A | 9/1994 | Stoll et al. | |
| 5,406,260 A | 4/1995 | Cummings et al. | |
| 5,522,431 A * | 6/1996 | Bonacorsi | F15B 13/0817 137/596.16 |
| 5,640,995 A | 6/1997 | Packard et al. | |
| 5,706,858 A * | 1/1998 | Miyazoe | F15B 13/0825 137/270 |
| 5,823,071 A | 10/1998 | Petrosky et al. | |
| 5,884,664 A | 3/1999 | Nagai et al. | |
| 5,887,623 A | 3/1999 | Nagai et al. | |
| 5,918,629 A * | 7/1999 | Hayashi | F15B 13/0817 137/270 |
| 5,929,536 A | 7/1999 | Stoll et al. | |
| 6,053,198 A * | 4/2000 | Atkin et al. | F16K 11/10 135/315 |
| 6,056,908 A | 5/2000 | Petrosky et al. | |
| 6,142,182 A | 11/2000 | Akimoto | |
| 6,164,323 A | 12/2000 | Smith et al. | |
| 6,164,335 A | 12/2000 | Hayashi et al. | |
| 6,170,527 B1 | 1/2001 | Hayashi et al. | |
| 6,173,731 B1 * | 1/2001 | Ottliczky | F15B 13/0817 137/271 |
| 6,173,745 B1 | 1/2001 | Hayashi et al. | |
| 6,206,045 B1 | 3/2001 | Hayashi et al. | |
| 6,213,153 B1 | 4/2001 | Hayashi et al. | |
| 6,216,740 B1 | 4/2001 | Hayashi et al. | |
| 6,382,257 B2 | 5/2002 | Mead et al. | |
| 6,427,723 B2 | 8/2002 | Bogdanowicz et al. | |
| 6,453,948 B2 | 9/2002 | Notz et al. | |
| 6,513,547 B2 | 2/2003 | Endo et al. | |
| 6,604,555 B2 | 8/2003 | Blatt et al. | |
| 6,636,782 B2 | 10/2003 | Morikawa et al. | |
| 6,701,962 B2 | 3/2004 | Latino et al. | |
| 6,704,815 B1 | 3/2004 | Morikawa et al. | |
| 6,734,020 B2 * | 5/2004 | Lu | G05D 11/133 436/55 |
| 6,812,590 B2 | 11/2004 | Lee et al. | |
| 6,830,067 B2 | 12/2004 | Hayashi | |
| 6,901,794 B2 | 6/2005 | Zobel et al. | |
| 6,972,955 B2 | 12/2005 | Pleskach et al. | |
| 7,011,113 B2 | 3/2006 | Gandrud | |
| 7,025,090 B2 | 4/2006 | Bramley et al. | |
| 7,061,142 B1 | 6/2006 | Marshall | |
| 7,191,800 B2 | 3/2007 | Bemer et al. | |
| 7,204,273 B1 * | 4/2007 | Zub | F15B 13/0814 137/625.64 |
| 7,328,720 B2 | 2/2008 | Miyazoe | |
| 7,383,851 B2 | 6/2008 | Jacobsen et al. | |
| 7,441,562 B2 | 10/2008 | Segawa et al. | |
| 7,457,250 B2 | 11/2008 | Austermann, III et al. | |
| 7,545,057 B1 | 6/2009 | Roo et al. | |
| 7,607,452 B2 | 10/2009 | Kühbauch et al. | |
| 7,616,453 B2 | 11/2009 | Bergmann | |
| 7,622,824 B2 | 11/2009 | Orr et al. | |
| 7,653,442 B2 | 1/2010 | Dalby et al. | |
| 7,690,398 B2 | 4/2010 | Kühbauch | |
| 7,798,174 B2 | 9/2010 | Ford et al. | |
| 7,849,880 B2 | 12/2010 | Herges | |
| 7,849,881 B2 | 12/2010 | Lee et al. | |
| 7,896,030 B2 | 3/2011 | Shinohara et al. | |
| 7,905,853 B2 | 3/2011 | Chapman et al. | |
| 7,912,562 B2 | 3/2011 | Dutè et al. | |
| 7,921,314 B2 | 4/2011 | Schindler et al. | |
| 7,925,811 B2 | 4/2011 | Ottliczky et al. | |
| 7,930,568 B2 | 4/2011 | Schindler | |
| 7,978,845 B2 | 7/2011 | Caveney et al. | |
| 8,074,680 B2 | 12/2011 | De Carolis et al. | |
| 8,076,797 B2 | 12/2011 | Kramer et al. | |
| 8,082,457 B2 | 12/2011 | Randall et al. | |
| 8,094,808 B2 | 1/2012 | Molenda et al. | |
| 8,375,986 B2 | 2/2013 | Miyazoe | |
| 8,713,226 B2 | 4/2014 | Graff | |
| 8,950,429 B2 | 2/2015 | Oike et al. | |
| 9,241,416 B2 | 1/2016 | Berner et al. | |
| 9,488,990 B2 | 11/2016 | Morikawa et al. | |
| 2001/0003289 A1 | 6/2001 | Mead et al. | |
| 2001/0022191 A1 * | 9/2001 | Bogdanowicz | F15B 13/0814 137/271 |
| 2001/0027813 A1 * | 10/2001 | Endo | F15B 13/0817 137/560 |
| 2002/0000257 A1 * | 1/2002 | Mead | F15B 13/0817 137/884 |
| 2004/0099314 A1 * | 5/2004 | Hayashi | F15B 13/0814 137/554 |
| 2005/0199305 A1 * | 9/2005 | Webber | F16K 27/003 137/884 |
| 2006/0011240 A1 * | 1/2006 | Berner | F15B 13/0814 137/554 |
| 2007/0133155 A1 * | 6/2007 | Zub | F15B 13/0875 361/679.02 |
| 2007/0137708 A1 * | 6/2007 | Kuhbauch | F15B 13/0821 137/269 |
| 2009/0112151 A1 * | 4/2009 | Chapman | A61M 1/28 604/29 |

FOREIGN PATENT DOCUMENTS

| | | | | |
|---|---|---|---|---|
| EP | 1094228 A1 * | 4/2001 | | F15B 13/0817 |
| JP | 2000283313 A * | 10/2000 | | F15B 13/0817 |
| JP | 2000283324 A * | 10/2000 | | F15B 13/0817 |
| JP | 2001032956 A * | 2/2001 | | F15B 13/0817 |
| JP | 2001254859 A * | 9/2001 | | F15B 13/0814 |
| WO | WO 9115037 A1 * | 10/1991 | | F15B 13/0817 |
| WO | WO 9404831 A1 * | 3/1994 | | F15B 13/0814 |

\* cited by examiner

| | | 50 | 40 | 52 | | |
|---|---|---|---|---|---|---|
| V31 | A19 | A19 | B19 | B19 | V32 | |
| V29 | A18 | A18 | B18 | B18 | V30 | |
| V27 | A17 | A17 | B17 | B17 | V28 | |
| V25 | A16 | A16 | B16 | B16 | V26 | |
| V23 | A15 | A15 | B15 | B15 | V24 | |
| V21 | A14 | A14 | B14 | B14 | V22 | |
| V19 | A13 | A13 | B13 | B13 | V20 | |
| V17 | A12 | A12 | B12 | B12 | V18 | |
| V15 | A11 | A11 | B11 | B11 | V16 | |
| V13 | A10 | A10 | B10 | B10 | V14 | |
| V11 | A9 | A9 | B9 | B9 | V12 | |
| V9 | A8 | A8 | B8 | B8 | V10 | |
| V7 | A7 | A7 | B7 | B7 | V8 | |
| V5 | A6 | A6 | B6 | B6 | V6 | |
| V3 | A5 | A5 | B5 | B5 | V4 | |
| 66 — V1 | A4 | A4 | B4 | B4 | V2 | — 76 |
| 86 — Vcomn | A3 | A3 | B3 | B3 | Vcomn | — 86 |
| 82 — P. E. | A2 | A2 | B2 | B2 | +24VDC | — 72 |
| 96 — Detect | A1 | A1 | B1 | B1 | 0VDC | — 74 |

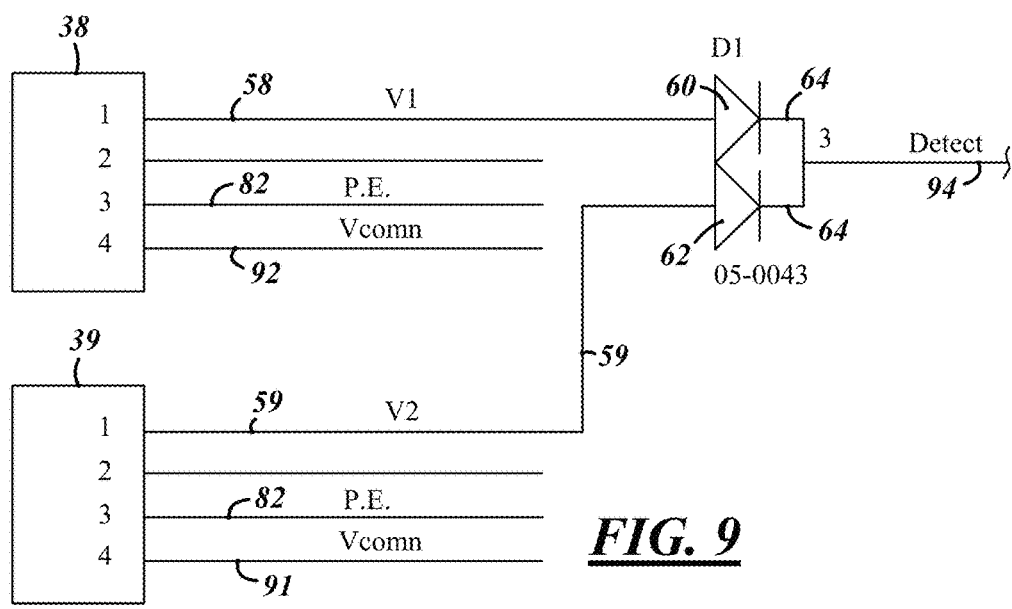

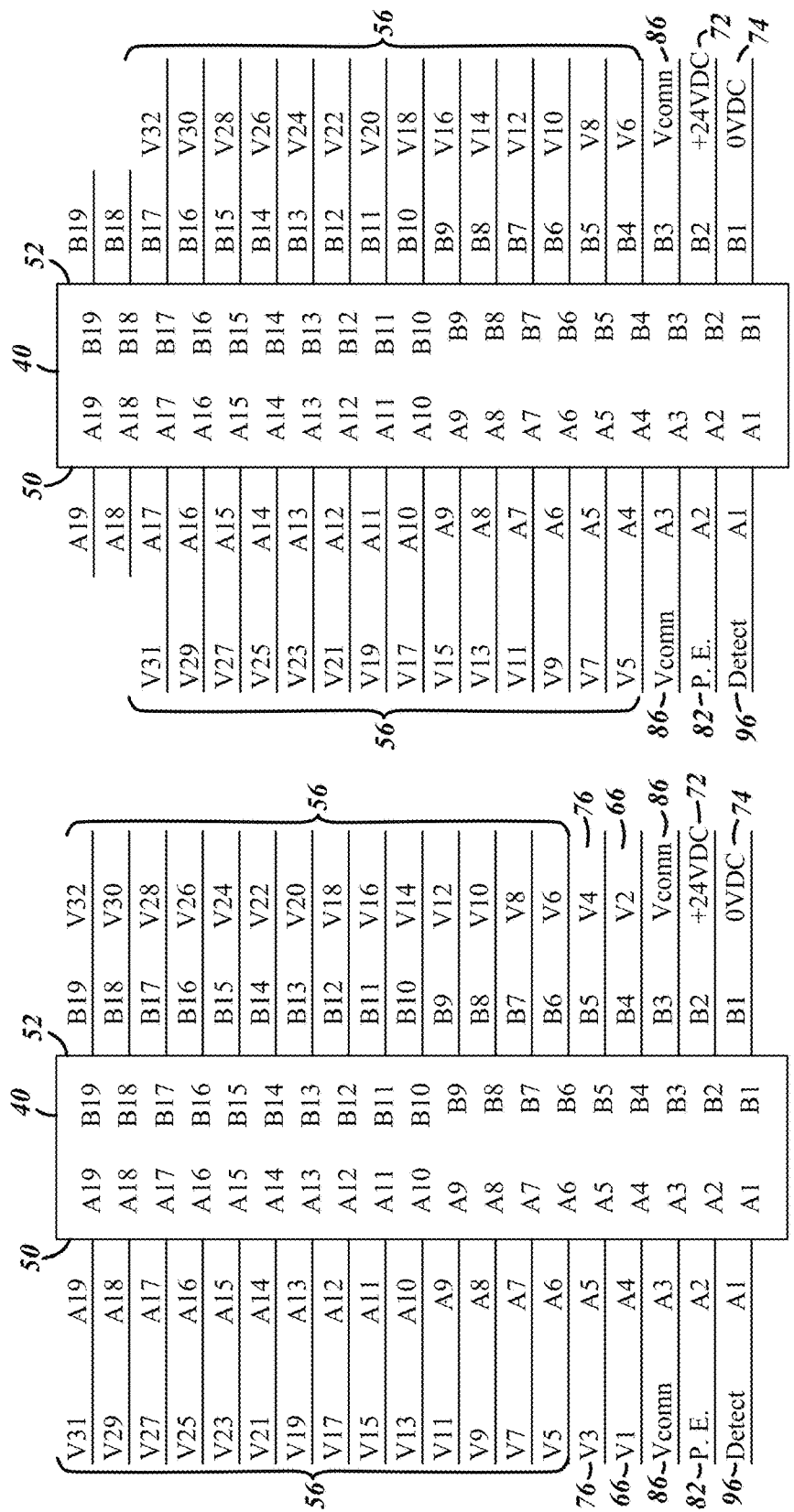

VALVE MANIFOLD CIRCUIT BOARD WITH SERIAL COMMUNICATION AND CONTROL CIRCUIT LINE

TECHNICAL FIELD

The field of this invention relates to a single line communication path between a driver and slave device, for example a solenoid actuated fluid control valve manifold assembly and a proportioning valve and more particularly to a multi-station circuit board for use with the manifold assembly having a single communication and control line.

BACKGROUND OF THE DISCLOSURE

Fluid control systems for controlling flow of hydraulic or pneumatic fluid have been used in automated manufacturing equipment, production lines and numerous industrial applications. Many of these fluid control systems take the form of a valve manifold that has a series of manifold members assembled together. Each manifold member commonly includes a manifold valve block and a control valve mounted thereon. The control valve may have a solenoid that actuates the valve and has a spring return for moving the valve when the solenoid is deactuated. Other control valves use a double (or dual) solenoid valve that has a first solenoid when actuated that moves the valve to the on position and a second solenoid when actuated that moves the valve to the off position.

Each manifold block houses a circuit board which has circuitry printed thereon to allow actuation of the control valve mounted to the manifold block. The circuit board also has circuits printed thereon to carry voltage to other circuit boards for the other control valves mounted on other manifold blocks.

The number of circuit boards connected together are usually limited by either the capacity of the driver in the communication module or the inherent design of the individual circuit boards. However, an expansion module with its own driver can be placed at the end of the first series of circuit boards to drive a second series of circuit boards and control valve thereby increasing the capacity of the valve manifold.

What is needed is a single line system between a driver and a slave device that provides information and control in the form of power therebetween that can be used for smart slave devices or other slave devices. In particular, it is desired that a circuit board passing through a manifold block has a serial or single communication line for each respective control valve and/or supplementary control, programming or parameterization. With the advent of smart slave devices, for example solenoid valves, proportional devices or pressure switches, it is desirable to transfer sensing data and control signals between a driver and a slave device.

What is also needed is a single control line through the first series of circuit boards that controls a second driver to control at least one proportional valve and other field devices by providing a variable output based on the variable input voltage.

SUMMARY OF THE DISCLOSURE

In accordance with one aspect of the invention, a driver device drives a valve manifold block for a fluid valve manifold that has a plurality of fluid pathways and ports therein controlled by a slave device in the form of a valve unit operably mounted thereto. A passage passes through the valve manifold from a first side to a second side of the valve manifold block. A printed circuit board that is received in the passage has a first edge in proximity to the first side with a plurality of first electrical connectors and a second edge in proximity to the second side with a plurality of second mating electrical connectors to connect to respective first electrical connectors in another printed circuit board in another valve manifold block.

The circuit board has a set of conductive valve control lines connected to and extending between a respective set of first electrical connections and a set of respective second mating electrical connectors. The circuit board also has at least one conductive valve control line extending from a respective first electrical connection to a third connector on the circuit board operably leading to one voltage side of a valve unit. A conductive common line is connected to the third connector operably connected to an opposite voltage side of the valve unit and also connected to a respective first electrical connector and a respective second mating electrical connector. A serial communication line has a respective first electrical connector at the first edge and a respective second mating electrical connector at the second edge for connection to a respective serial communication line in another valve manifold block for communicating information relating to the valve unit.

In one embodiment, the serial communication line extends to and is connected to a low voltage side of the valve unit. Optionally, the circuit board serves a second valve unit on the valve manifold block. The serial communication line extends to and is connected to a low voltage side of the second valve unit.

In one embodiment, the serial communication line is used as a detection circuit line to detect if the valve unit mounted to the valve manifold block uses a single solenoid valve unit or double solenoid valve unit. The circuit board serves a second valve unit on the valve manifold block. The set of conductive valve lines extend from a set of first electrical connectors at the first edge and extend to and shifted to a staggered relative position at a set of second mating electrical connectors. A leg line is preferably connected from the third connector to the detection circuit line through a diode to only allow current to pass in the direction from the leg line to the detection circuit line.

According to another aspect of the invention, fluid control system has a fluid valve manifold with a plurality of valve manifold blocks fastened to each other so as to form fluid pathways extending through the manifold and a passage through each valve manifold that aligns with each other to collectively form a continuous electrical conduit for receiving a series of connected circuit boards that actuate a respective valve unit mounted to a respective valve manifold block. Each circuit board has a set of conductive valve control lines connected to and extending between a respective set of first electrical connectors and a respective set of second mating electrical connectors. A conductive common line is connected to a third connector operably connected to one voltage side of the valve unit and also is connected to a respective first electrical connector and respective second mating electrical connector for connection to a respective conductive line in another valve manifold block. A serial communication line in each circuit board has a respective first electrical connector at of the first edge and a respective second mating electrical connector at the second edge for connection to a respective serial communication line in another valve manifold block.

At least one circuit board serves at least one double solenoid valve unit having two conductive valve lines for each double solenoid valve unit extending from the first electrical connector to a third connector at an opposite voltage side of each double solenoid valve unit at the valve manifold block for actuating each double solenoid valve unit. At least one circuit board serves at least one single solenoid valve unit having a conductive valve line for each single solenoid valve unit extending from the first electrical connector to a third connector at an opposite voltage side of each single solenoid valve unit at the respective valve manifold block for actuating each single solenoid valve unit. The serial communication line for the at least one circuit board serves the at least one single solenoid valve unit by extending to and connecting to a low voltage side of each single solenoid valve unit for communicating information relating thereto.

Preferably, a leg line is connected from the third connector to the detection circuit line through a diode to only allow current to pass from the leg line to the detection circuit line.

Also, preferably, the set of conductive valve lines extend from the respective set of first electrical connectors at the first edge and extend and are shifted to a staggered relative position at the set of second mating connectors.

In accordance with one aspect of the invention, a serial communication circuit line includes a master, e.g. a driver device, which is normally used to energize a load through an operating circuit; e.g. a power circuit. The master drive circuit is designed in such a way that it not only turns the load on or off through a power circuit, but also sends data to the load through a single wire for reading and/or writing various parameters which can be used for diagnostic information or to change the functionality of the load. The load can be in the form of a smart slave device, (e.g. "smart" solenoid valve, proportional device, pressure switch or other component that requires monitoring, control or parameterization), which has appropriate circuitry to decipher and interpret the data sent from the master driver and can also report back information from the slave device to the master driver through the same single wire.

The single wire communication system usually in a form of a trace on the slave device board uses a bias voltage to power the electronic circuitry within the slave device. The master then modulates the current to the single wire trace in order to create voltage pulses that are greater than the bias potential thereby allowing the slave to identify that data is coming from the master.

The slave can only respond to a master's request or command, it cannot initiate communication. When responding to a master's request, the slave modulates the current to the single wire trace in order to create voltage pulses that are less than the bias potential thereby allowing the master to identify that data is coming back from the slave.

The handshaking routine can be comprised of data frames which has a start bit, 8 data bits and one stop bit. The complete data frame has 8 bytes, an address byte, a command byte, five data bytes and one checksum byte. The checksum byte is simply the sum of the preceding seven bytes and is used for error detection.

Addressing the slaves is required since the single wire communication trace is usually connected to a plurality of slave devices. Thus, it is important to identify which slave device is being addressed. This addressing function is done on initial power-up, or is initiated by the user when appropriate, and is achieved by the utilization of the existing "coil output" signals which are typically used to energize solenoid coils of conventional valves.

Upon power-up, the "coil output" signals are configured to sequentially strobe each coil trace with a very fast pulse, which is too fast to energize the coil of an attached valve. A sensing circuit in the slave is then triggered by the strobe pulse to allow that specific slave to receive an address.

Once the first slave gets an address from the master, the strobing sequence is incremented so the next slave device can be assigned sequential addresses. The system continues this addressing routine until all possible slave devices get a sequential address.

After all slave devices are addressed, the master can communicate to each individual slave device without affecting any other slave devices.

For example, the driver device is a smart valve driver device uses "active high" or PNP driver ICs to drive each of 32 coils on the valve manifold. The common for all 32 coils is 0 VDC. An isolated "switched" power is used to drive the manifold coils and is completely isolated from the "unswitched" power when used to power the logic and input sections of the manifold. Like a conventional valve driver, the smart valve driver receives its output data from the communication module. The valve driver then updates the drive ICs every 2 milliseconds with the output data which turns the coils on or off depending on the I/O data sent from the communication module.

In accordance with another aspect of the invention, a fluid control system includes a fluid valve manifold with a plurality of valve manifold blocks fastened to each other so as to form fluid pathways extending through the manifold and a passage through each valve manifold that aligns with each other to collectively form a continuous electrical conduit for receiving a first series of connected circuit boards that each actuate a respective valve unit mounted to each valve manifold block. Each circuit board has a set of conductive valve lines connected to and extending between a respective set of first electrical connectors and a respective set of second mating electrical connectors. A first communication module with a valve driver with a plurality of outputs actuates the valve units connected to the first series of connected circuit boards. A conductive common line is connected to one voltage side of a respective first electrical connector and respective second mating electrical connector for connection to a respective conductive common line in another valve manifold block.

A serial control line extends through the first series of connected circuit boards that is connected to a second driver for actuating a second series of connected circuit boards. The serial control line is formed from a serial control line segment in each circuit board that has a respective first electrical connector at the first edge and a respective second mating electrical connector at the second edge for connection to a respective serial control line segment in another circuit board in another valve manifold block. The serial control line is constructed to control the voltage at the plurality of outputs of the second driver to control the voltage input to the valve units connected to the second series of connected circuit boards. Preferably, at least one valve that is connected to one of the circuit boards in the second series of connected circuit boards is a proportional valve.

BRIEF DESCRIPTION OF THE DRAWINGS

Reference now is made to the accompanying drawings in which:

FIG. 8 is a schematic end view of a second edge of the circuit board for two single solenoid valve units as shown in FIG. 3 illustrating the terminals' connections to respective circuits in the circuit board;

FIG. 9 is a schematic view of the detection circuit installed on the first face of the circuit board for two single solenoid valve units as shown in FIG. 3;

FIG. 12 is a schematic end view of a first edge of the circuit board for two double solenoid valve units as shown in FIG. 4 illustrating the terminals' connections to respective circuits in the circuit board;

FIG. 13 is a schematic end view of a second edge of the circuit board for two double solenoid valve units as shown in FIG. 4 illustrating the terminals' connections to respective circuits in the circuit board;

DETAILED DESCRIPTION OF THE PREFERRED EMBODIMENT

Figure 1:
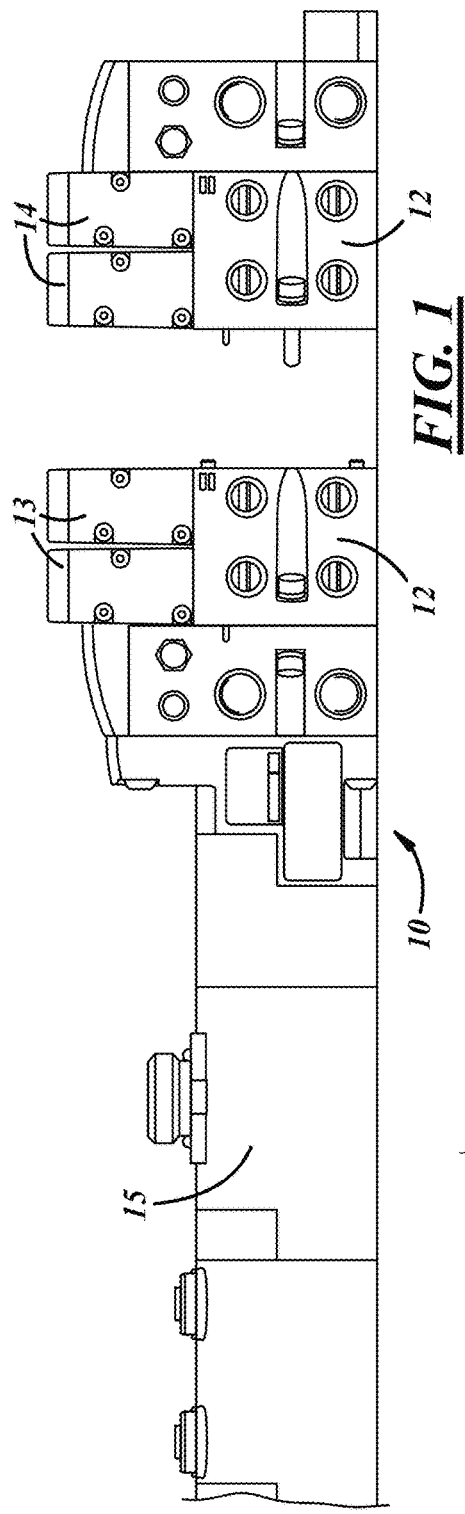
FIG. 1 is an exploded side elevational view of a fluid control system in accordance with one embodiment of the invention.
Figure 2:
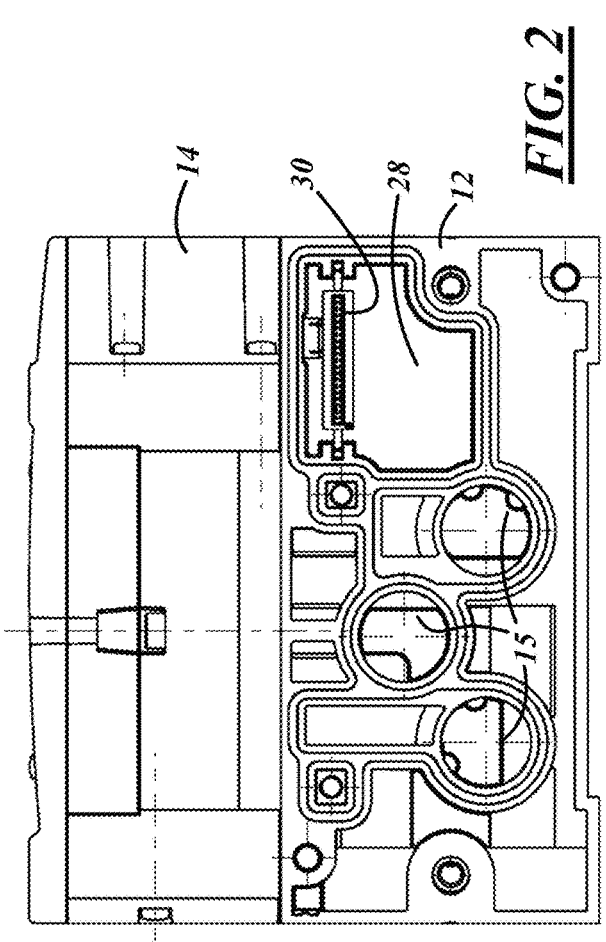
FIG. 2 is an enlarged side elevational view of one circuit board installed in a manifold block for two valve units as shown in FIG. 1.

Referring now to FIGS. 1 and 2, the fluid control system 10 is modular in nature and depending on the application has a varying number of valve manifold blocks 12 interconnected together. Only two manifold blocks 12 are shown for simplicity of the drawings. Some of the valve manifold blocks 12 may have single solenoid valve units 13 mounted thereon and some of the valve manifold blocks 12 may have double solenoid valve units 14 mounted thereon. Sometimes double solenoid valve units are referred to as dual solenoid valves. All blocks 12 are connected to a communication module 15. The manifold block 12 has fluid supply and exhaust ports 17 therethrough that are connected through ports (not shown) that lead to the valve units 13 and 14 to control fluid flow.

Figure 3:
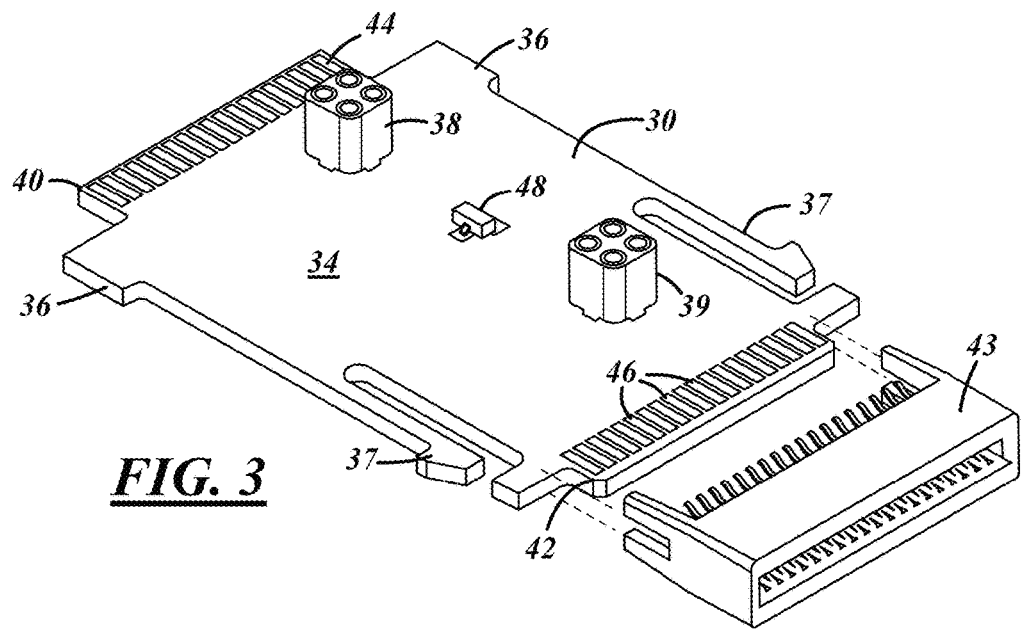
FIG. 3 is a perspective view of a circuit board for two single solenoid valve units in accordance with one embodiment of the invention.
Figure 4:
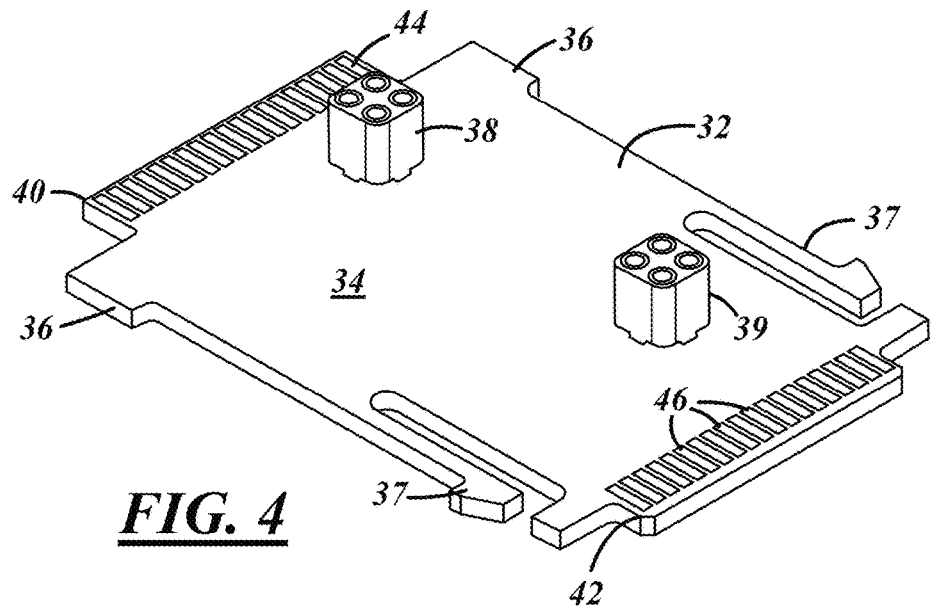
FIG. 4 is a perspective view of a circuit board for two double solenoid valve units in accordance with another embodiment of the invention.
Figure 5:
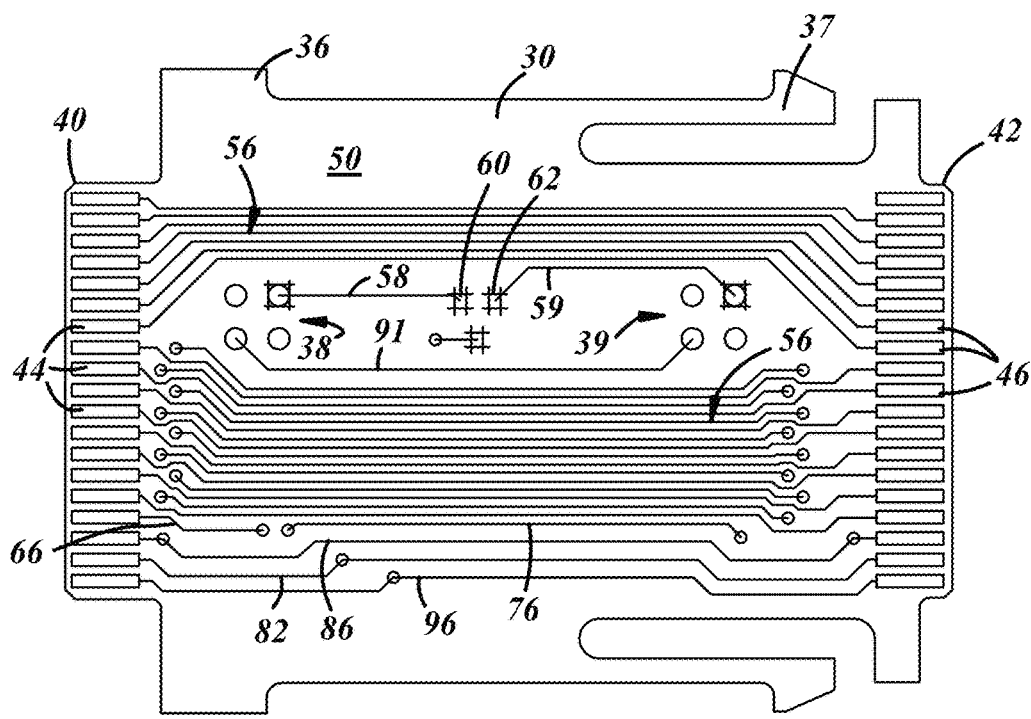
FIG. 5 is a plan view of a first face of the circuit board for two single valve units as shown in FIG. 3 illustrating the circuit layout.

Preferably, each valve manifold block 12 may accommodate two single solenoid valve units 13 or two double solenoid valve units 14. Each valve manifold block 12 has a passage 28 that receives a single circuit board assembly 30 or a double circuit board assembly 32. Referring now to FIGS. 3 and 4, each circuit board assembly 30 and 32 may have a board 34 with a pair of stop shoulders 36 that engage appropriate shoulders and grooves in the passage 28. Each circuit board may also have a pair of flexible tab arms 37 that also similarly engage the groove in the passage such that the circuit board can be removably installed into the passage 28 by a snap fit.

Each circuit board 30 and 32 has pin connectors 38 and 39 mounted on a respective board 34. Each board has a first edge 40 and second edge 42 with respective trace contacts 44 and 46. As shown in FIG. 3, a standard bridge connector 43 electrically connects the aligned trace contacts 44 and 46 of adjacent boards 30. The single board 30 has a diode assembly 48 mounted thereon. Circuit board 32 is absent this diode assembly 48 as illustrated in FIG. 4.

Figures 6, 7:
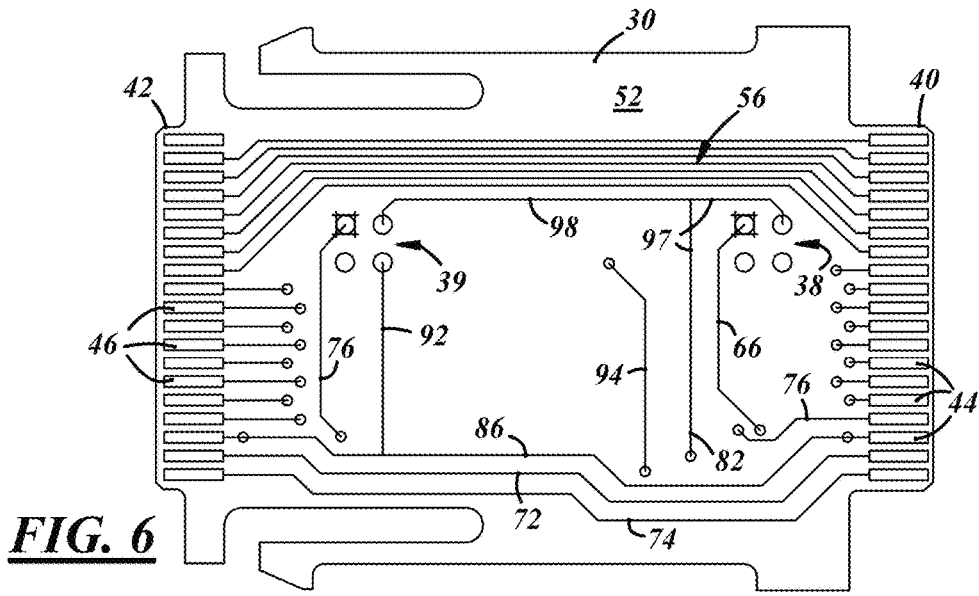
FIG. 6 is a plan view of a second face of the circuit board for two single valve units as shown in FIG. 3 illustrating the circuit layout.
FIG. 7 is a schematic end view of a first edge of the circuit board for two single solenoid valve units as shown in FIG. 3 illustrating the terminals' connections to respective circuits in the circuit board.
Figure 10:
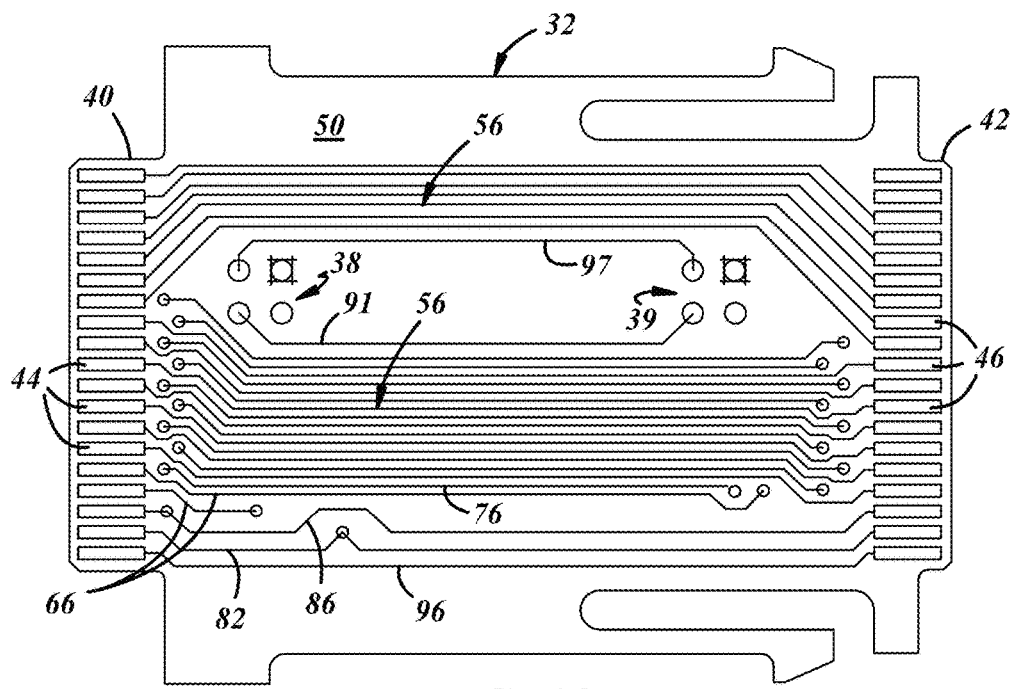
FIG. 10 is a plan view of a first face of the circuit board for two double solenoid valve units as shown in FIG. 4 illustrating the circuit layout.
Figure 11:
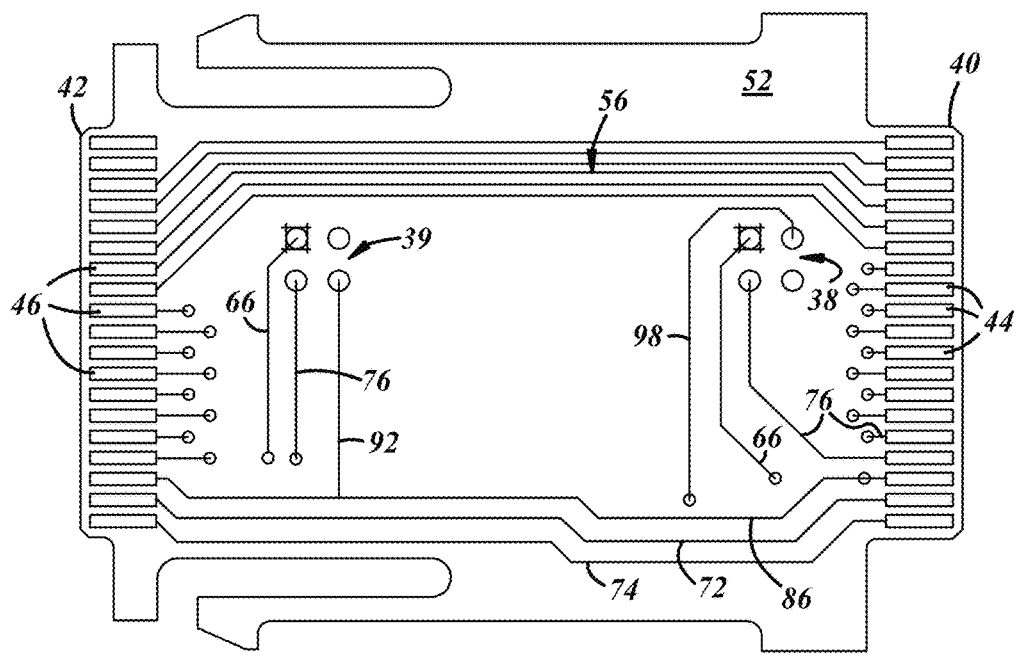
FIG. 11 is a plan view of a second face of the circuit board for two double solenoid valve units as shown in FIG. 4 illustrating the circuit layout.

Referring now to FIGS. 5 through 9, the board 30 as shown in FIG. 3 will be described in further detail. The first edge 40 may have trace contacts 44 on both faces 52 and 54 of the board. As shown in FIGS. 7 and 8 the terms labeled A or B, e.g. A1-A19 and B1-B19 as a prefix refer to the positions of the contacts and conductive lines on the respective side 50 or 52. The terms labeled with the V as a prefix, e.g. V1, V2, etc. refer to the downstream valve number that the circuit operates counting from the shown circuit board. The number notation, e.g. 56, 66 are the conductive printed circuit lines on each board. A set of conductive valve lines 56 labeled V3 through V31 in FIGS. 7 and 8 on both faces 52 and 54 extend from one edge 40 to the second edge and may be decremented one position from edge 40 to edge 42. For example, on face 50, V3 at position A5 on edge 40 drops one position to position A4 on edge 42 to be connected to a V1 contact at position A4 on edge 40 of a sequential board. On face 52, V4 at position B5 on edge 40 may drop one position to position B4 to be connected to a V2 contact at position B4 of the sequential board. Top contacts at position A19 and B19 are not connected to any conductive lines on the board. In this particular shown circuit board, V31 indicates that the valve manifold using that circuit board is limited to a maximum thirty-one solenoid valves. Other layouts for the circuit board lines are possible to arrange for less or for more solenoid valves.

At first edge 40, the conductive valve line 66 corresponding to position A4 and operating the first valve V1, i.e. the valve on the present manifold block 12 leads to pin connector 38. Another conductive valve line 76 corresponding to position B4 and operating the second valve, i.e. the second single solenoid valve on the present manifold block 12 leads to pin connector 39. The pin connectors 38 and 39 are connected to the respective valve units 13. Each valve solenoid unit 13 is also respectively connected to pin connectors 38 and 39 which are connected to legs 91 and 92 that lead to a common voltage line 86 labeled Vcomn at each face 52 and 54. The Vcomn lines 86 at each face are connected to each other. The lines 86 are normally connected to a 24 volt supply to power all of the valve units 12 and 13.

Conductive lines 56 and 66 corresponding to V1 and V2 also both have legs 58 and 59 leading to a respective diode 60 and 62 in diode assembly 48. Each diode has its output connected to a leg 64 as clearly shown in FIG. 9 that connects to a leg 94 that leads to a detection circuit line 96 that extends from edge 40 to 42 at positions A1 and A1 at each edge. This detection line 96 as well as the common voltage line 86 labeled Vcomn are not decremented but pass straight through from one edge to the other without dropping any positions. Other lines such as an auxiliary power circuit lines 72 labeled 24 VDC at position B2 and its return line 74 labeled 0 VDC at B1 as well as a protective earth line 82 labeled PE and often referred to as a ground at position A2 may also pass straight through without any decrementation of position. Legs 97 and 98 connect line 82 to the respective connector pins 38 and 39.

Referring now to FIGS. 10-14, the double circuit board 32 is constructed to mount two double solenoid valve units. Similar or corresponding part numbers from the board 30 will have corresponding similar numbers. As such, a set of conductive valve lines 56 labeled particularly V5 through V32 at edge 40 corresponding to position A6-A19 on face 50 and positions B6-B19 on face 52 pass to edge 42 and are decremented two positions i.e. to positions A4-A17 on face 50 and B4-B17 on face 52 such that they connect to corresponding positions on a sequential board. At edge 42, contacts A19 and A18 on face 52 and B19 and B18 are not connected to any conductive lines on the double board 32.

The board 32 has conductive valve lines 66 for V1 and V2 connected to pin connector 38 and conductive valve lines 76 for V3 and V4 are connected to pin connector 39 to power the two double solenoid valve units 14. Similar to the single circuit board 30, the double board 32 has a common voltage line 86 labeled Vcomn at each face 50 and 52 to power all the valve units, detection line 96, auxiliary power circuit lines 72 labeled 24 VDC and its return line 74 at 0 VDC, and protective earth line 82 PE or ground line that are not decremented. The detection line 96 at position A1 is not connected to the connectors 38 or 39 or the double valve units associated with this double circuit board 32.

In this valve operation, there is a sinking driver, i.e. power line which is supplied to along conductive power line 86 which is connected to all solenoids. In order to actuate the valve, each line 56, 66, or 76 must individually be grounded. This is usually done through an IC chip or driver at the end of the line, e.g. at the communication module 15 and connected to all of the conductive lines 56, 66 and 76. When a selected line is grounded, electrical current is then able to flow from the common power line 86 labeled Vcomn and through the selected solenoid and to ground to actuate an individual valve V1-V32. However, it is also foreseen that a sourcing driver can also work, i.e. a grounding common is connected to all solenoids and to actuate a valve, a voltage, for example 24V is individually connected.

The detection line 96 can be used to determine if the circuit board is a single board 30 or a double board 32. In one method, all the conductive valve lines 56, 66, and 76 are actuated. In the shown system, this actuation is done by grounding the valve lines V1-V32 through an IC component or driver connected at one end from the first board. The power supply line 86 Vcomn is then able to provide current through each solenoid and down through the individual lines V1-V32. In operation, all the solenoid valves are actuated and the V1-V32 lines are grounded, thus the voltage detected on the detection line 96 is 0V.

Each contact is selectively and individually deactuated, i.e. turned off in sequence by the driver IC circuit usually housed in communication module 15. When the V1 line in the shown circuit board 30 is turned off, the V1 line is no longer grounded so V1 line reads 24V, in other words it now has the same voltage as the Vcomn line. The leg 58 which is directly connected to the V1 line also reads 24V and passes through the diode 60 as shown in FIG. 9 to outlet leg 94 on the circuit board which connects to the detection line 96. The detection line 96 then reads 24V.

The V1 line is then re-actuated, and the V2 line is deactuated. Similarly, the V2 line will then read 24V when the V2 line is deactuated. The detection leg 94 downstream of diode 62 again reads 24V. Thus, when V1 and V2 lines both are sequentially deactuated and the detection lines reads 24V for both deactuations, it is thus determined that the circuit board associated with V1 and V2 for this board is a single solenoid circuit board 30.

Figure 14:
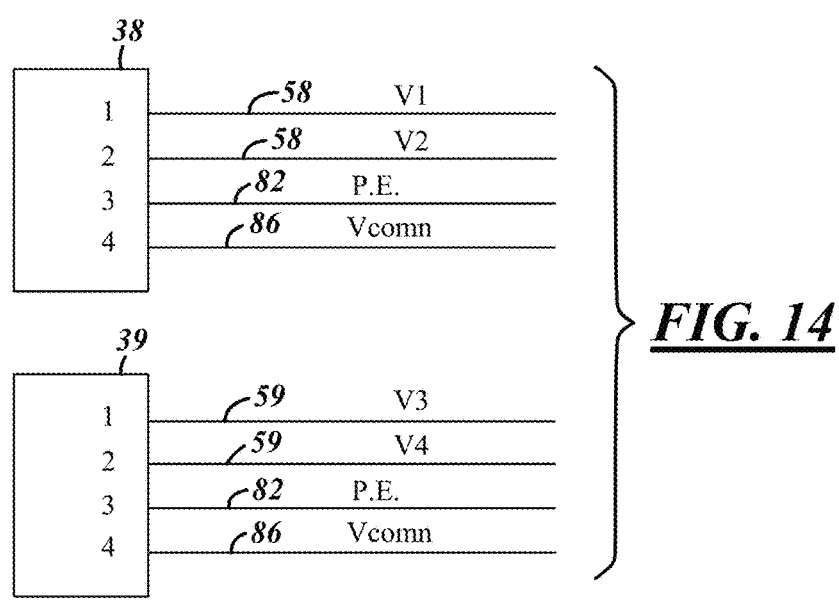
FIG. 14 is a schematic view of a circuit leads connected to the four valves in the two solenoid double valve units for the circuit board shown in FIG. 4.

On the other hand, if the four voltage lines i.e. V1-V4 of double board 32 are actuated and deactuated in sequence, the detection line 96 as shown in FIG. 14 does not change from its 0V readout, because it is not connected to any of line V1-V4 on this double board 32. Thus, when the detection circuit line reads 0V when the fours lines V1-V4 are sequentially actuated and deactuated, it can be deduced that the circuit board associated with these four valve lines are with a double solenoid board 32.

The process of the driver sinking (or sourcing) the voltage charge for this detection is very fast, so as not to change the position of the valve. For example, a sinking pulse or strobe connected by the driver to 0V can be 0.2 milliseconds. This is substantially too short to mechanically move the valve from its previous position. Furthermore, when the strobe is sent to valve status V1, none of the other valve lines V2-V32 are affected, because they did not receive this strobe.

Other logical mapping and communications can be used with this single detection line 96 that passes through all the circuit boards 30 and 32. For example, if only one-line V2 reads 24 V when deactuated but V1 remains at 0V when deactuated, it may be deduced that there is a no coil or solenoid valve in the valve unit associated with V1.

Figure 15:
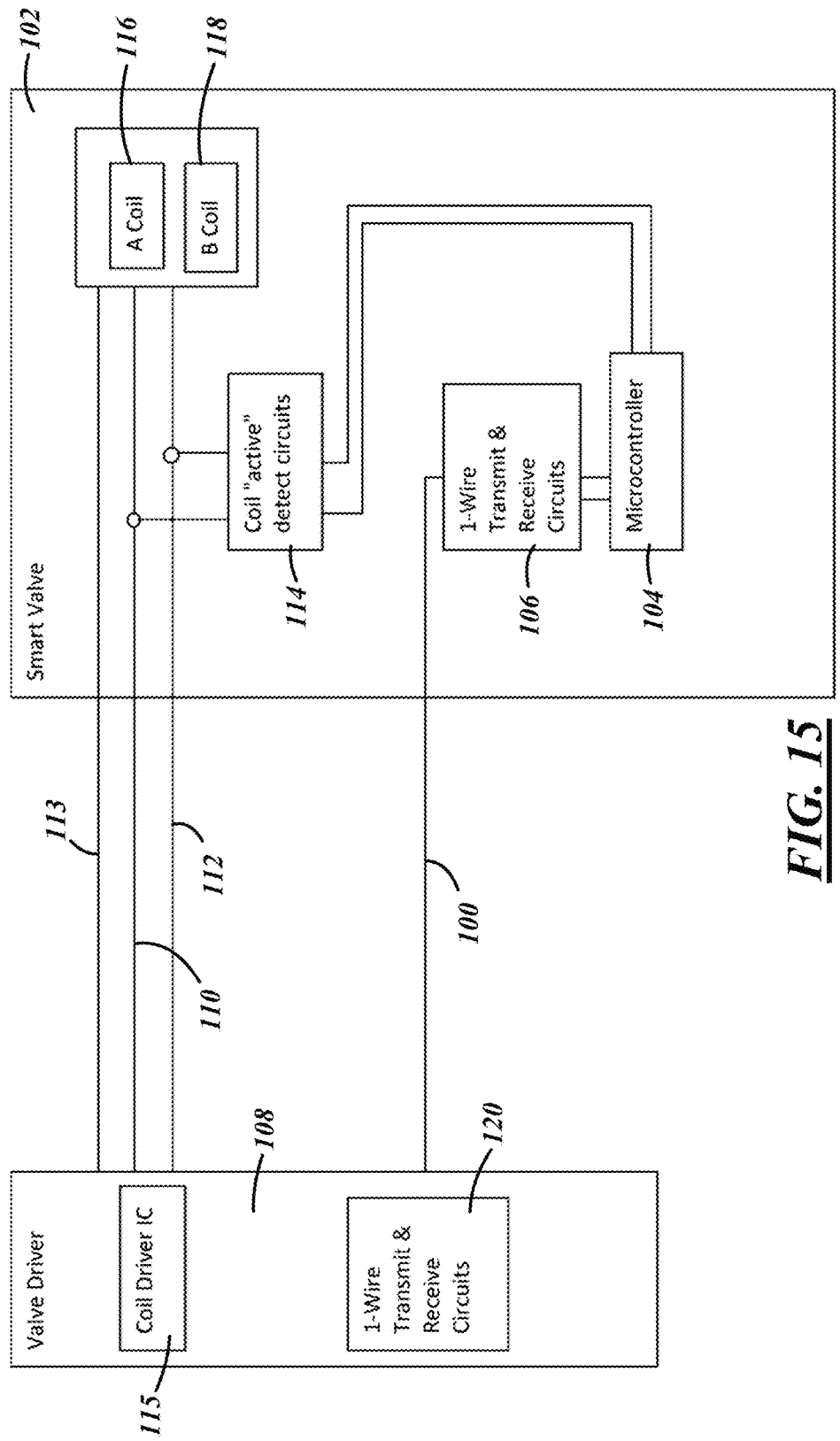
FIG. 15 is a schematic view of an alternate embodiment in accordance with the invention between a smart master and smart slave valve device with two coils.

It is also foreseen that instead of or in addition to a detection line, a single serial communication line may be used in other embodiments and for other purposes than detecting the presence of single and double solenoid circuit boards and the presence or absence of single or double solenoid valve units mounted on the valve manifold units of a fluid control system. Referring now to FIG. 15, a serial communication line 100 can be used with smart slave devices, e.g. smart valves 102 with its own serial controller 104 and transmitting and receiving circuit 106 as shown in FIG. 15. These other purposes for example can be counting the number of actuations or having other communication signals emanating from the individual valve units and sent through the serial communication line 100 to be received to a processor or other communication device, e.g. communication module 15, at the end of the line, programming or parameterization functionality.

In an alternative embodiment, in order to transmit data from the driver master 108 to the slave (valve) on the same connecting trace 100 that is also used to power the electronic circuitry and micro controller 104, the master device 108 modulates the current to create voltage pulses that are greater than the bias potential allowing the slave device to identify that the data is coming from the master driver. The slave can only respond to a master's request or command, it cannot initiate communication. When responding to a master's request, the slave modulates the current to the single wire trace 100 in order to create voltage pulses that are less than the bias potential, allowing the master to identify that data is coming back from the slave.

This handshaking routine is comprised of data frames which consist of a start bit, 8 data bits and one stop bit. The complete data frame consists of 8 bytes, an address byte, a command byte, five data bytes and one checksum byte. The checksum byte is simply the sum of the preceding seven bytes and is used for error detection.

Circuitry 106 and 104 on the slave valve is able to decode these data pulses for parameter and/or diagnostic functions.

Addressing the slaves is required since the single wire communication trace is connected to the entire set of 32 valves. Thus, it is important to identify which slave valve is being addressed. This addressing function for each smart valve is done on initial power-up, or is initiated by the user when appropriate, and is achieved by the utilization of the existing "coil output" signals which are typically used to energize solenoid coils of conventional valves.

Upon power-up, the "coil output" signals are configured to sequentially strobe each coil trace 110 and 112 with a very fast pulse from coil driver 115, which is too fast to energize the coil 116, 118 of an attached valve 102. The common voltage is along line 113. A detect circuit 114 in the slave is then triggered by the strobe pulse to allow that specific slave to receive an address.

Once the first slave obtains an address from the master, the strobing sequence is incremented so the next slave can be assigned sequential addresses. The system continues this addressing routine until all 32 possible slaves are assigned a sequential address. After all slaves are addressed, the master can communicate to each individual slave without affecting any other slave's function. Because each of the slaves receives a sequential address (1-32), the smart driver can then communicate with each slave individually at any time during operation. Smart slaves may be mixed on the same manifold with regular (Non-smart) valves.

Each of the smart valves (slaves) connected to the one wire is able to communicate with the smart driver through its transmit and receive circuit 120. Commands and data are sent from the smart driver to the smart slaves along line 100. Data and slave type is sent from the smart slaves to the smart driver along line 100.

One function that the smart valve may have is counting the number or times it has been energized. The smart valves will detect the activation of both the "A" and "B" coils 116, 118 and will record the total counts into non-volatile memory located on the smart valve circuitry. Additional slave types such as "smart pressure transducer" (Detect and report air pressure) or "smart pressure regulator" (regulate air pressures) are also possible.

In this fashion, communication through the valve manifold block assembly of a fluid control system is achieved by using a single serial communication line that is in direct contact with individual valve units throughout the manifold block assembly.

Figure 16:
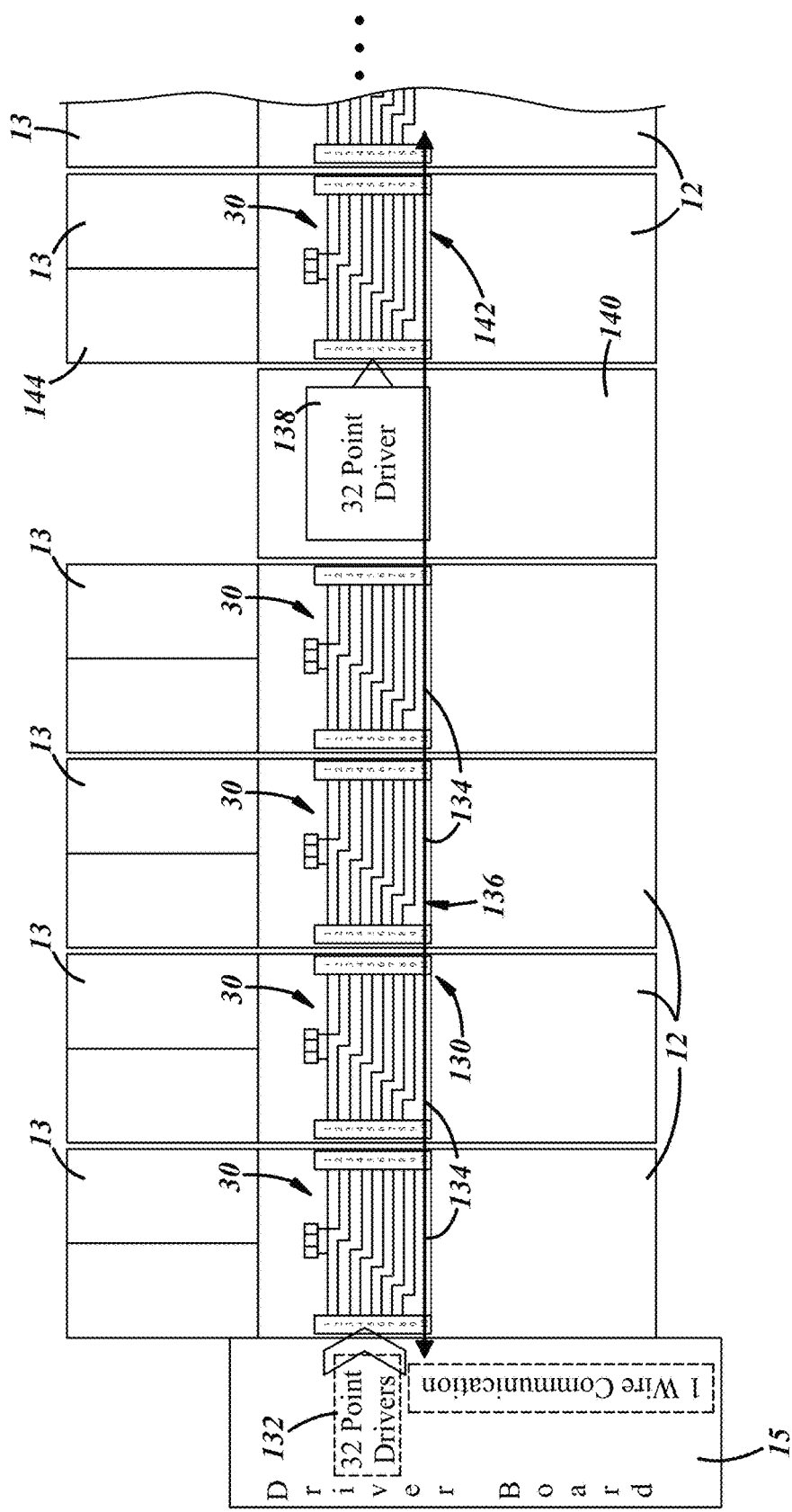
FIG. 16 is a schematic view of an alternate embodiment of the invention showing a control line extending through a first series of circuit boards to control a second series of circuit boards that can control proportional valves.

In another embodiment shown in FIG. 16, a first series 130 of circuit boards 30, each circuit board being in a respective manifold block 12, is operably connected to a first driver 132 installed in communication module 15. Each circuit board 30 shown in FIG. 16 in each manifold block 12 is operably connected to a respective valve unit 13 as described before. Each circuit board 30 has a control line segment 134 that similarly extends from edge to edge in similar fashion to detection line 96 as previously described by not being decremented but passing straight through from one edge to the other without dropping any positions. The segments 134 are joined together to form a control line 136 that extends from the main communication module 15 to a second driver unit 138 in a second communication module 140. The second driver unit 138 is then connected in similar fashion to a second series 142 of circuit boards 32.

The control line 136 by being connected to a second communication module 140 with its own driver 138 allows the fluid control system 10 to be longer and with more valve stations than what the original design capacity of either driver 132 or the first series 130 of circuit boards 13 dictated. Furthermore, the control line may provide a control signal to the second driver unit 138 that proportionally controls the input voltage to a valve unit 13. In this fashion, one of the valve units 13 connected to the second series 142 of circuit boards may be a proportioning valve (indicated at 144) or other voltage dependent valve that is actuated through respective circuit board 13 with variable voltage. For example, the control input voltage may vary between 0-10 volts to provide adjustable output pressure between 0-100 PSI. While only one proportioning valve 144 is shown in FIG. 16, for simplicity of the drawings, the other valve units 13 in the second series 142 may incorporate a plurality of proportioning valves 144.

Other variations and modifications are possible without departing from the scope and spirit of the present invention as defined by the appended claims.

The embodiments in which an exclusive property or privilege is claimed are defined as follows:

1. A fluid control system comprising:
   a driver device and plurality of slave devices connected to said driver device through an operating circuit for operating;
   a detection circuit connected to each slave device to detect whether said operating circuit is active;
   said respective detection circuit connected to a single serial communication line that is in communication with said driver for communicating information between said driver and said plurality of slave devices;
   a fluid valve manifold having a plurality of valve manifold blocks fastened to each other so as to form fluid pathways extending through said fluid valve manifold and a passage through each valve manifold block that aligns with each other to collectively form a continuous electrical conduit receiving a series of connected circuit boards that each actuate a valve unit mounted to each valve manifold block;
   each circuit board having a set of conductive valve lines connected to and extending between a respective set of first electrical connectors and a respective set of second mating electrical connectors;
   a conductive common line in each circuit board connected to one voltage side of a respective first electrical connector and a respective second mating electrical connector for connection to a respective conductive common line in another valve manifold block; and
   said single serial communication line is formed by said series of connected circuit boards with each circuit board having a line segment with a respective first electrical connector and electrically connected to a respective second mating electrical connector for connection to a respective first electrical connector in another circuit board.

2. A fluid control system as defined in claim 1 further comprising:
   at least one of said slave devices having its respective detection circuit connect to said single serial communication line through a microcontroller and a transmitter and receiving circuit in said at least one of said slave devices.

3. A fluid control system as defined in claim 2 further comprising:

said single serial communication line communicating between said driver and said plurality of slave devices by dropping voltage pulses for communication from one of said drivers and to the other of said driver and said slave device and by raising voltage pulses for communicating from the other of said driver and said slave device to one of said driver and slave devices.

4. A fluid control system comprising:

a fluid valve manifold having a plurality of valve manifold blocks fastened to each other so as to form fluid pathways extending through said fluid valve manifold and a passage through each fluid valve manifold that aligns with each other to collectively form a continuous electrical conduit for receiving a first series of connected circuit boards that each actuate a respective valve unit mounted to each valve manifold block;

each circuit board having a set of conductive valve lines connected to and extending between a respective set of first electrical connectors at a first edge thereof and a respective set of second mating electrical connectors at a second edge thereof opposite from said first edge;

a first communication module having a valve driver with a plurality of outputs for actuating the respective valve units connected to said first series of connected circuit boards;

a conductive common line connected to one voltage side of a respective first electrical connector and respective second mating electrical connector for connection to a respective conductive common line in another valve manifold block;

a serial control line extending through the first series of connected circuit boards and connected to a second driver for actuating a second series of connected circuit boards; and said serial control line is formed by said first series of connected circuit boards with each circuit board having a line segment having respective first electrical connector at said first edge and a respective second mating electrical connector at said second edge for connection to a respective first electrical connector of another line segment in another circuit board valve in another manifold block;

said serial control line constructed to control the voltage for at least one of the plurality of outputs of the second driver to control the voltage to at least one valve unit connected to the second series of connected circuit boards.

5. A fluid control system as defined in claim 4 further comprising:

at least one valve connected to one of the circuit boards in the second series of connected circuit boards being a proportional valve.

6. A fluid control system as defined in claim 5 further comprising:

a plurality of valves connected to the second series of connected circuit boards being proportional valves.

\* \* \* \* \*